(12) United States Patent
Tuononen (10) Patent No.: US 8,666,562 B2
(45) Date of Patent: Mar. 4, 2014

(54) FRICTION ESTIMATION METHOD (75) Inventor: Ari Tuononen, Espoo (FI)

(73) Assignee: Aalto University Foundation, Aalto (FI)

( * ) Notice: Subject to any disclaimer, the term of this patent is extended or adjusted under 35 U.S.C. 154(b) by 64 days.

(21) Appl. No.: 13/119,598

(22) PCT Filed: Sep. 18, 2009

(86) PCT No.: PCT/FI2009/050749
§ 371 (c)(1),
(2), (4) Date: May 26, 2011

(87) PCT Pub. No.: WO2010/031905
PCT Pub. Date: Mar. 25, 2010

(65) Prior Publication Data
US 2011/0264300 A1    Oct. 27, 2011

(30) Foreign Application Priority Data

Sep. 19, 2008   (FI) ...................................... 20085883

(51) Int. Cl.
*G01N 19/02* (2006.01)
*G01M 17/02* (2006.01)
*B60T 8/1763* (2006.01)

(52) U.S. Cl.
USPC ................ 701/1; 701/70; 701/80; 73/8; 73/9

(58) Field of Classification Search
USPC ............................................ 73/9; 701/70, 80
See application file for complete search history.

(56) References Cited

U.S. PATENT DOCUMENTS

| 4,094,555 A | 6/1978 | Byrne et al. |
| 5,229,955 A | 7/1993 | Nishiwaki et al. |
| 5,353,225 A | 10/1994 | Tsuyama et al. |

(Continued)

FOREIGN PATENT DOCUMENTS

| DE | 44 35 448 A1 | 4/1995 |
| EP | 0 412 791 A2 | 2/1991 |

(Continued)

*Primary Examiner* — Khoi Tran
*Assistant Examiner* — Ryan Rink
(74) *Attorney, Agent, or Firm* — Womble Carlyle Sandridge & Rice, LLP (57) ABSTRACT

A method and apparatus for the estimation of maximum friction between a vehicular tire and a road surface via driving dynamics measurements and at least one sensor measuring the road surface, comprising
  measuring road surface properties via a sensor;
  measuring the state of motion of a vehicle and a tire and concluding therefrom a momentary maximum friction coefficient when the tire is subjected to a sufficient friction force;
  storing a maximum friction estimate concluded from the above-mentioned measurements, along with measuring results regarding road surface properties measured at the moment of measurement;
  when the tire is not subjected to a friction force sufficient for measuring maximum friction, using, as a maximum friction estimate, the previously measured maximum friction estimate, such that an applied selection criterion for the maximum friction estimate is the newness as up-to-date as possible of the measuring result and a consistency of the road surface measuring result.

9 Claims, 5 Drawing Sheets

(56) References Cited

U.S. PATENT DOCUMENTS

| | | |
|---|---|---|
| 5,586,028 A | 12/1996 | Sekine et al. |
| 6,470,731 B1 | 10/2002 | Rieth |
| 6,597,980 B2 | 7/2003 | Kogure |
| 6,692,089 B2 | 2/2004 | Kuwajima et al. |
| 7,248,958 B2 | 7/2007 | Watanabe et al. |
| 7,702,446 B2 * | 4/2010 | Hiwatashi ............ 701/80 |
| 2002/0072841 A1 * | 6/2002 | Kogure ............ 701/80 |
| 2002/0111752 A1 | 8/2002 | Nakamura |
| 2003/0117015 A1 | 6/2003 | Kuwajima et al. |
| 2004/0138831 A1 | 7/2004 | Watanabe et al. |

FOREIGN PATENT DOCUMENTS

| | | |
|---|---|---|
| EP | 1 415 876 A1 | 5/2004 |
| GB | 2 428 754 A | 2/2007 |
| JP | 06-138018 | 5/1994 |
| JP | 2007-186928 A | 7/1995 |
| JP | 2007-176260 A | 7/2007 |
| WO | WO 2004/016485 | 2/2004 |
| WO | WO 2004/016485 A1 | 2/2004 |

* cited by examiner

FRICTION ESTIMATION METHOD

CROSS-REFERENCE TO RELATED APPLICATIONS

This application is a national stage filing under 35 U.S.C. 371 of PCT/FI2009/050749 filed Sep. 18, 2009 which International Application was published by the International Bureau in English on Mar. 25, 2010 and claims priority to Finnish Patent Application No. 20085883, filed on Sep. 19, 2008 which are both hereby incorporated herein in their entirety by reference.

BACKGROUND OF THE DISCLOSURE

1. Field of the Disclosure

The invention relates to the estimation of tire friction in vehicles, particularly to the estimation of maximum friction available at a specific time. The knowledge regarding maximum friction is especially desirable in anticipatory warning and steering systems, in control of anti-lock brakes, in slip control systems, and in driving stability systems.

2. Description of Related Art

In the driving stability systems, ABS brakes and slippage control systems of vehicles, as well as for example in systems estimating or automatically controlling a safety distance, it is necessary to have as precise knowledge as possible about the friction properties of a tire, it is particularly important to know the available maximum friction force and the grip characteristics of a tire in the driving situation where the tire operates close to its maximum friction force.

The knowledge as accurate as possible about a maximum friction force and an amount of tire slippage producing the maximum friction force enables the system to work faster in a braking or slipping situation. Braking, for example, can be applied from the very beginning with an almost optimal braking force, whereby the amount of slippage for the tires in braking can be made more optimal right at the beginning compared to the situation that the measuring result regarding slippage and maximum friction force is not obtained until during the braking action. Knowledge about friction is also needed in the process of cautioning the driver about slippery conditions or increased need to maintain a safety distance. In case the driver is frequently warned unnecessarily, the benefit of warnings is questionable as false alarms are mostly just annoying. On the other hand, it can be even more hazardous if the driver learns to rely on the warning and the system fails to issue a warning about slippery conditions.

Currently, the most common method of estimating maximum friction is based on driving dynamics measuring results. The maximum friction can be estimated with reasonable reliability and accuracy as long as the tire is subjected to forces which are sufficiently high with respect to the available maximum friction potential. This is based on the fact that there is always slippage between a tire and a road surface whenever the tire has force applied to it and the tire rolls along the road surface. Knowing the slippage of a tire at various values of linear or curvilinear acceleration enables a maximum friction to be concluded on the basis of measuring results. In cornering, the lateral force and the returning moment of a tire can also be used for making conclusions regarding a maximum friction of the tire. Prior art publications dealing with friction measurement by means of driving dynamics include, for example:

Pasterkamp, Wim R., The tyre as sensor to estimate friction, Delft University Press, Delft, 1997, p. 148.

Fudaka, Yoshiki, Slip-Angle Estimation for Vehicle Stability Control, Vehicle System Dynamics, 32 (1999), pp. 375-288.

Umeno, Koji, JP20022331951

Hisaaki, Asai, JP2006082620

Naoyasu, Enomoto, JP716928

On the basis of the above-cited documents, slight braking or acceleration of a vehicle enables a maximum friction to be concluded (Hisaaki, Naoyasu). In cornering, the maximum friction can be concluded when about 30% of the friction force of a maximum friction has been applied (Pasterkamp, Fukada, Umeno). The tire can be fitted with sensors measuring strains, accelerations or forces for facilitating a measuring process. Progress in the art has been rapid and in all likelihood the estimation of tire friction advances also in the future, for example by virtue of sensors integrated in a tire, a rim or a wheel hub. Therefore, quite probably, the maximum friction can be estimated in the future with a lesser-than-before friction force and more reliably than before.

However, friction measurements conducted on the basis of driving dynamics do not provide a reliable measuring result in case the friction forces applied to a tire are slight with respect to a maximum friction, i.e. the slippage resulting from the friction force is so slight that it cannot be reliably measured at least within a reasonable time span and with a sufficient accuracy. When driving a long distance straight without accelerating or braking, a maximum friction measuring result is not obtained. This is a highly typical situation in long-distance driving.

Road friction is also estimated by measuring the surface of a road with sensors. This is a way to find out whether there is ice, water, tarmac, road salt etc. on the road surface. One example of a sensor that has been found functional is Road Eye from Sweden, which measures reflection factors of appropriately selected wavelengths from a road surface. Also useful is polarization and glare reflection information, thus enabling for example a measurement of water film properties. Employed as road sensors are also radars operating over 24 GHz and 76 GHz ranges and, in principle, it is also possible to use also lower radio or alternating current frequencies for measuring dielectric or electromagnetic properties of a road. Ultrasonic sensors can be used for measuring at least the properties of snow and a soft surface. Laser sensors enable measuring a surface profile and surface roughness. A passive infrared sensor enables measuring surface temperature.

The road surface can be classified by means of a sensor and ice and water can be identified thereby. However, all that is found out from the road surface classification result is a rough estimate about a maximum friction between tire and road. For example, the friction coefficient between ice and a tire may fluctuate within the range of 0.05 to 0.5. The friction of clean tarmac is also highly inconsistent. Thus, the information provided by a sensor cannot be directly used for concluding a maximum friction as the friction depends not only on the road but also on tires, tire pressures, and a tire's surface pressure, and for example the type of ice, surface crystals, loose snow, surface roughness, temperature or cleanliness may have a major effect on the amount of friction. Accordingly, sensor measurements only provide rough information about a probable maximum friction. The road surface classification data obtained by means of a sensor can be beneficial even without knowledge about maximum friction because, for example in full-scale braking on snow, it is advisable to allow more slipping than on tarmac or ice. Hence, on different materials, the maximum friction force results from different amounts of slippage and knowing the type of road surface may assist in selecting a more effective control algorithm for example for ABS brakes. With measurements conducted during a braking or slip controlling action, finding the most effective way of braking takes usually less time if the type of road surface or the friction properties of the road is known in advance.

Measurement of friction on the basis of driving dynamics and measurement of road surface properties have been worked on in numerous projects independently of each other. On the other hand, the sensor developers aspire towards identifying for example black ice. The identification of black ice with sensors increases safety considerably, but the road surface classification result (e.g.: dry, wet, icy), as such, is only useful as a very rough friction estimate. The driving stability system is in any case required to conduct a continuous measuring process of friction forces and it is able to calculate an estimation of maximum friction at the start of slipping and when the friction forces make up about 30% of maximum friction forces. This is perhaps why those involved in the studies of driving dynamics have not regarded road sensors as worthwhile tools in the process of friction estimation and the measuring results of road sensors have not been utilized in driving control as an aid in the estimation of maximum friction, but only to caution the driver about ice, for example. The classification result as such, without the estimation of maximum friction according to the invention, can be beneficial also as input data or a parameter of the driving stability system, for example in the process of selecting automatically the chassis setups more suitable for off-road driving or in the above-described process of identifying a snow-covered road.

Publication EP0412791 describes an arrangement for estimation of friction on basis of sensor data. Because the system itself is not measuring the friction and storing the measurement results for later use. For this reason the accuracy is dependant on the accuracy of the sensors and accuracy of the empirical friction measurements and models. Therefore, the system does not adapt to ageing of sensors and wearing of the tyre.

Publication WO2008075126 describes also a similar system, but this system either doesn't update driving dynamics measurement results into classified measurement results of the road surface, and therefore the system doesn't adapt to different tyre-vehicle pairs and for example to variation of sensors.

A sensor that is useful in a system according to the invention is presented in application SE0701102 (A).

Measurement of tyre friction and properties of different road surfaces are investigated in publication: http://www.control.1th.se/database/publications/article.pike?artkey=jsvenPDH Inventions made in the same project with the present invention are described in publications DE102007053256 and WO2008061852.

SUMMARY OF THE DISCLOSURE

An object of the invention is to provide a more accurate-than-before estimate for maximum friction for more of the time than before. Another object of the invention to provide a more reliable-than-before error estimation for the estimated maximum friction value. This enables improving the systems controlling a vehicle's driving dynamics and the driver can be cautioned about slippery conditions on the basis of information more precise than before. For example, on the basis of a mere sensor message, there will be unnecessarily frequent warnings in winter conditions about ice which is not more slippery than usual. The warnings perceived to be futile do not improve safety, but are just a nuisance to the driver. Thus, it is another objective to improve the reliability and legitimacy of warnings delivered to the driver.

According to the invention, the maximum friction of a road is under estimation whenever it is possible to obtain a reliable estimate for the maximum friction on the basis of measuring results. Upon receiving an estimation result regarding the friction between a road and a tire, the estimate will be stored in a memory along with readings provided by said sensors simultaneously in the process of measuring the road surface, or along with classification results derived from the readings. When a maximum friction estimate is not available, use will be made of road sensor data in combination with earlier maximum friction estimates and road sensor measuring data, such that each piece of the road sensor measuring data is compared with the preceding successful piece of measuring data measured during the course of friction measurement. If the measuring data has remained the same, the preceding maximum friction estimate shall be regarded as the most reliable estimate about maximum friction and shall be used.

When the measuring result of a road sensor changes after a maximum friction estimate, each road surface measuring result will be preferably classified and, on the basis of this, used as an estimate will be the newest classified maximum friction estimate, at the moment of conducting whose measurements the road sensor's measuring result was close to each road surface measuring result. Thus, when the road surface changes, the classified database will be searched for a road measuring value as fresh and identical as possible and the maximum friction estimate corresponding to this measuring value will be used as an estimate also for the current road surface or a suitable value will be interpolated from closely correlated old maximum friction estimates. The classification, interpolation or the modeling of a correlation between the road sensor's measuring results and friction can be effected by using known statistical methods, or a multidimensional result vector of the measuring sensor can be classified by using, for example, a neural network or a corresponding learning classification algorithm. Statistical methods can also be used for the classification and modeling of measuring results for finding, as a function of the multidimensional measuring vector, a probable friction value and an estimation error thereof. Reliability can be judged not only by a margin of error calculated at the moment of estimation but also according to how old is the maximum friction estimate corresponding to each road surface classification result and how often the corresponding measuring result has been obtained. Hence, for example in city driving, it is possible to judge friction measuring results regarding salted intersections and stretches of road therebetween to be reliable, because a measuring result is obtained from two different road surfaces at almost every intersection and occasionally between intersections. Thus, it can be presumed that the intersections delivering successive identical measuring results from a road surface sensor are similar also in terms of friction properties thereof, the stretches between intersections being likewise probably similar as long as the road surface measuring results thereof are similar. A different, frequently recurring road surface can also be found in winter conditions at bus stops, around which the ice being readily polished to become more slippery than other parts of the road. The reliability of a maximum friction estimate itself is affected, for example, by a driving dynamics situation, i.e. the slippage and direction of a tire, forces applied thereto, and the measuring accuracy of the latter. Oftentimes, the probability distribution representing the reliability of an estimate is asymmetrical in such a way that the available maximum friction potential is known with certainty to have at least a certain value.

The sensor-delivered measuring results need not be interpreted, sufficing to organize the results by classification for finding a matching measuring result from amongst the road surface measuring results. Instead of a measuring result, it is possible to use also classified results or those estimated from a multitude of old measurements. In case there are several road surface measuring results giving a similar result, the use is most preferably made of the newest measuring results as such or new measuring results are weighted more than the old ones. The deviation of friction values corresponding to the classification results of measurements can be utilized in working out a margin of error. In order to play it safe, it is possible to place more weight on an estimate giving the lowest maximum friction, especially when cautioning the driver for example about a safety distance too short or a situational speed too high.

Also the measurement results from driving dynamics can be used for classification, and the measurement results from driving dynamics can be stored in more detail than maximum friction alone, for example the slip and steering force values can be stored as function of side forces. Advantageously the system recalls for example the value of the maximum friction and the corresponding slip for each classified measurement result. It is also possible to recall more accurate tyre force diagram and the measurement result of the tyre force diagram can be used to opposite direction for classification, in which case the accuracy of driving dynamics improves and the tyre force diagrams measured in small slip values that are not adequate for estimation of maximum friction as such can be used for assisting the classification together with the sensor data for recognition and classification of the road surface.

In addition to newness, an applicable basis for selecting a measuring result is also map or positional data, i.e. taking advantage of geographically close conducted measurements in addition to those conducted temporally close by. The use of positional data calls for the use of a positioning device. The positional data and a telecommunication link enable gathering real-time information about road surface, for example for the demands of road management or product development relevant to tires.

The characteristics of tires change along with wearing and aging of the same, this invention comprising primarily the use of friction measuring results as fresh as possible, i.e. road surface classification results are predominantly searched from amongst the newest measuring results. In addition, the use of old measuring results is preferably disallowed after changing the tires, for example the difference between summer and winter tires being often too significant for the old measuring results to be of any use. In the spring, for example, the friction of just recently installed summer tires would probably be estimated on icy or snowy surface as being considerably higher than its true value, while on tarmac the friction would be underestimated. The disparity from a true maximum friction can be multiplied after changing the tires, which is why, after changing the tires there is either used old basic data measured with similar tires and sensors or the use of old (before the change of tires) data is at least denied. Measuring data can also be gathered as per tire model from other vehicles or the measuring data of tires driven in a preceding season can be saved for the next season, whereby the previous year's data can be corrected also statistically, i.e., new measuring results are used as a basis for processing old data to make it comply with the newest results.

According to the invention, the driver can be cautioned as the friction properties of a tire seem to have changed for worse. The deterioration may result for example from incorrect tire pressures or damage to the tire, for example from oil or loosening of studs. The source of altered friction properties may also be a sensor defect, a change of tire without notifying the system, wearing or faulting of shock absorbers or other parts of the chassis. Thus, the system works preferably as an aid to the driver and notices a change of driving feel also over a long period by comparing old and fresh measuring results with each other. Normally, the driver does not notice slowly changing driving characteristics, for example the deterioration of maximum friction caused by the wearing of a tire or wheel suspension. A method according to the invention enables tracking the friction properties of a tire as a function of time, since the system monitors not only the maximum friction but also the road surface measuring results and enables comparing to each other the results measured with a similar road surface in similar conditions.

The reading of a road surface measuring sensor can also have positional data integrated therewith and a telecommunication link enables the integration of data gathered by several vehicles, on the basis of which it is possible to classify road surface properties and to even make predictions about the grip of one's own tires based on measuring results of other road users. However, the measurements made by other vehicles have been conducted with different measuring devices and possibly with very different types of tires. By also integrating information about the tires of a measuring vehicle or by classifying the properties of tires and measuring-data transmitting vehicles in a centralized manner, it is possible to make more use of the measuring results of other vehicles as well. Required for this is a fair number of vehicles fitted with a system of the invention in order to provide each vehicle with measuring data appropriate therefor over one and the same stretch of road. The centralized estimation of maximum friction may also provide information about disparities of the maximum friction in the tires of vehicles moving in line. For example the icy smooth road creates a large difference between the typical studded tire and non-studded winter tire. This knowledge can be used for warning all the road users by roadside displays.

By means of the exchange of information or the centralized estimation of maximum friction, it is possible to anticipate for various braking accelerations for example by making safety distances longer or by giving instructions to restrict the accelerations of a line, such that the hazard of a multiple pile-up accident is diminished by reacting to a change of speed of the vehicle ahead more quickly and with lesser deceleration, whereby those driving on tires with less grip than the others have a possibility of maintaining safety distances as the line decelerates. Warning information can be supplied by short-range communication technologies or also to automobiles not provided with a system of the invention. It is also possible, at least technically, to use for example signal lights or a microwave transmitter to warn, for example, about the need of a longer safety distance because of a tire grip clearly worse than that of the others. In certain winter conditions, for example, the braking distances of heavy-duty traffic can be surprisingly much longer than those of other traffic, whereby cutting inside the safety distance disturbs and endangers the traffic. Especially in intersections, it may beneficial to warn about a low friction in order to refrain from trying to cut into the safety distance that has been lengthened because of slippery conditions.

The driver can be further cautioned by vibration of the steering wheel or some other control device or by an audio signal about a change of the road surface whenever the change has an effect on the value of maximum friction. This vibration or audio signal may also inform of a probable improvement of the grip, i.e. the question is not necessarily about just a warning. In addition, a warning can be issued when the driver's situational speed is too high in view of the available maximum friction, or when the available maximum friction deteriorates abruptly. The driver can also be displayed a probable friction margin on the dash board, along with an acceleration measuring result, preferably with a delay regarding the peak values of acceleration and the minimum value of maximum friction, such that the screen is able to visualize not only the instantaneous value but also historical peak value readings, which reveal the maximum friction force employed over a certain distance or time, for example over the last ten minutes, and the lowest estimated maximum friction force in order to indicate a friction margin. The driver can be further displayed a current braking distance and a maximum corner steepness at the current speed and with the estimated tire grip. The braking distance can be presented as a three-dimensional reflection display on the windshield, whereby the change of risk level caused by the driver's driving speed at a given moment is visible to the driver as clearly and reliably as possible and can be considered in proportion to the viewing obstacles and the driving situation. The braking distance can also be presented as a time or a distance, or it is possible to use a light spot reflected on the road to indicate the theoretically shortest stopping distance.

The driving stability and slippage control of vehicles offers its best utility in connection with heavy-duty combination vehicles as the skidding of a combination trailer and vehicle is not easily controlled by the driver when the skid has already begun. The combinations often have different tires on different axles, and as a result, there may be major variations in driving characteristics in various road conditions. The system according to the invention assists in anticipating and controlling the risk situations of such a combination better than before. The system according to the invention can be also be installed on a trailer, in which case the trailer-mounted system of the invention can independently calculate maximum friction estimates on the basis of measuring data given by the tractor vehicle's or its own road sensors, or the trailer can be provided with just a memory unit or a database for storage of measuring data to be used with the driving control system of another tractor vehicle in order to make the trailer's measuring data available for the system of the next tractor vehicle. The system according to the invention is adaptable for any friction-driven vehicle, a passenger car or a motorcycle, and even a pedestrian can be warned about slippery conditions provided that the road sensors and friction measurements can be arranged.

Sensors can be used for measuring the road surface alongside a driving line in order to provide a warning about slippery conditions in the grooving outside the driving line or to anticipate a changing friction. The motorcycle, in particular, is sensitive even to a narrow slippery section of road and, for example, crossing a slippery repair patch of bitumen or a slippery lane marker has often led to accidents. If a loss of grip can be anticipated, the control of slipping may reduce traction or braking even before the grip is lost and the driver can be cautioned for example by means of a haptic sensation, such as by means of one-sided vibration of the steering device or reshaping of the seat's side rest.

BRIEF DESCRIPTION OF THE SEVERAL VIEWS OF THE DRAWING(S)

In the following, a detailed operation of the invention is described by means of a temporal diagram.

DETAILED DESCRIPTION OF THE DISCLOSURE

Figure 1:
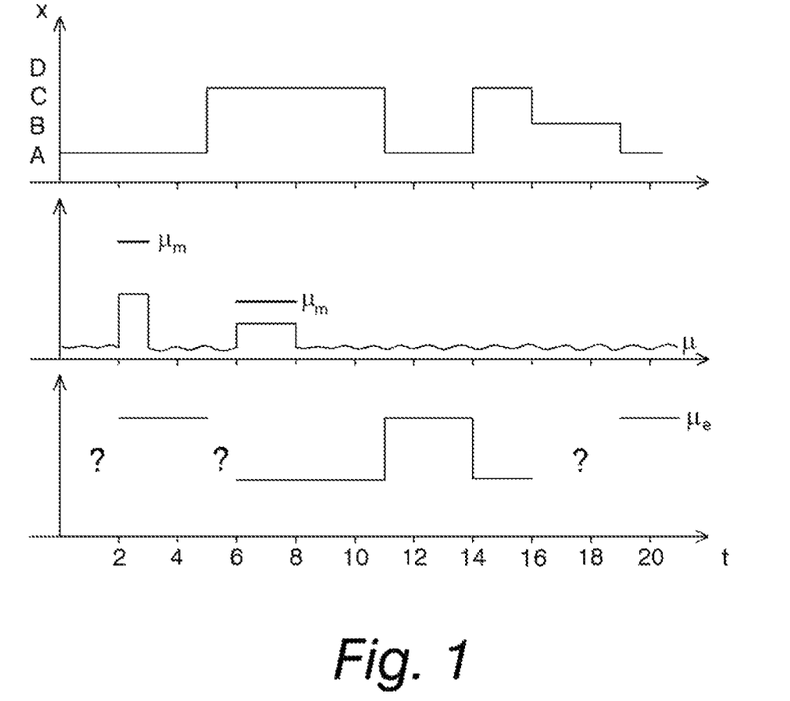
FIG. 1 is a temporal diagram about the operation of a method according to the invention.

In the FIG. 1, the top graph is a road sensor's classification result X, varying in the example among classes A, B, C, and D. The true measuring result, however, is a multidimensional vector, which may comprise information for example about the reflection factors of a road sensor, the polarity of a reflection, and the directions of a reflection on various wavelengths of electromagnetic radiation, about temperature, humidity, etc. In addition, the road surface can be measured also outside the tires' traveling lines in order to enable a warning to be given about an inconsistent grip of the road. The quantity X can be for example a 10-dimensional classification result of 16-bit measuring results and a vector established by their frequency analysis. In practice, X acquires a considerable number of different values, and classification can be used for finding more quickly a corresponding old measuring result and for facilitating the selection of similar friction estimates.

The graph $\mu$ is a graph for a momentary employed friction coefficient, said $\mu$ being low in normal cruising, and said $\mu$ being generally far from a maximum friction $\mu_m$ of tires. The maximum friction $\mu_m$ can only be measured reliably by today's technique when $\mu$ is at least about 30% of $\mu_m$. Thus, the estimated result $\mu_m$ maximum friction is discontinuous, and it only has a value when tires are subjected to a sufficient friction force, for example during a braking action. The measuring accuracy and sensitiveness can be probably improved, but it is probably impossible in a normal driving situation to ever obtain an accurate measuring result without using for example a "fifth wheel" or without, for example, braking or turning one wheel for measurement. The measurement leads always to energy losses and wears tires. In normal conditions, the accumulation of data relevant to maximum friction estimates of the invention is not very substantial, since the maximum friction estimate can only be produced over a relatively small portion of the driving time. If the driving style is such that an estimate for maximum friction is produced over much of the time, the amount of data can be reduced for example by choosing not to store individually results measured successively over an almost identical road surface for as long as the tire grip also remains the same. In this case, it is possible to store just statistical characteristics, for example the average and deviation of estimates similar to each other. Not until the grip improves or deteriorates, for example in response to a tire warming up, will a new value be stored.

A maximum friction $\mu_e$ estimated by the system is unknown over a time 0-2 since, for the beginning, no friction has been successfully measured with a road surface measuring result X=A. When a value is obtained for $\mu_e$ over a time 2-3 this value will be applied for as long as the road surface measuring or classification result X=A. At a time instant 5 the road surface measuring result X is replaced by a value C, and $\mu_e$ is again unknown.

An instant 6 marks a successful measurement of $\mu_m$, and this measuring result is adopted by $\mu_e$ as its value. $\mu_e$ retains its value until, at an instant 11, the road surface measuring result becomes A again and $\mu_e$ re-adopts the value which was measured for $\mu_m$ over the time 2-3, which was the previous time that X adopted the value A.

At an instant 14, the road surface measuring result re-adopts the value C, and $\mu_e$ is given back the value that was measured for $\mu_m$, over the time 6-7.

At an instant 16, the road surface measuring result adopts a value B. Since, during the road surface measuring result B, a successful measurement is yet to be made for the maximum friction $\mu_m$, the $\mu_e$ is unknown and $\mu_e$ must be given a predicted value or a value interpolated on the basis of measuring results close to the road surface measuring result B or the lowest value thereof. In practice, this situation occurs very seldom, as long as a sufficient number of friction measurements have been conducted for various road surfaces. Another factor in this process is the classification of multidimensional measuring result vectors, a very fine classification leading in practice to a continuous search of the closest matching measuring results and possibly to a slow progress of the system and a very coarse classification leading within a class to the uncertainty of a friction value. The use of SOM maps (Self-Organizing Map) for classification enables the retrieval of and comparison between the maximum friction estimates of similar road surfaces. At the same time is obtained a readily understandable visual map, on the basis of which it is possible to assess the reliability of friction estimates for road surfaces classified by various methods. If the measuring vectors of a road surface sensor are colored on an SOM map as a function of the maximum friction estimate, a noisy or color-shifting portion of the map represents similar type of road surface measuring results, which are nevertheless dissimilar in terms of the maximum friction thereof. On the other hand, a steady color tone represents measuring data highly classified in terms of its maximum friction properties.

It is also possible to store information about how high the maximum friction $\mu_m$ is at its minimum on a given road surface. On a highly adhesive road surface, for example, the friction coefficient of µ0.2 is not high enough to bring about sufficient slipping for enabling a measurement of $\mu_m$. Because µ0.2 is less than 30% of the maximum friction µ, it means that $\mu_m$ is at least 0.66. In normal driving on a highly adhesive road surface there is seldom used a friction force sufficient for measuring maximum friction, because a successful execution of the measurement would require a moderately rough style of driving or sharp braking. The friction values µ, $\mu_m$, and $\mu_e$ can also be vector values or can be substituted by measuring lateral and longitudinal force factors individually. In addition, the lateral and longitudinal force factors can be measured independently in both directions, because for example an asymmetrical tire pattern or an asymmetrical tire tread or radial structure can provide a grip which is unequal in various cornering directions, whereby the grip in braking and acceleration can be likewise unequal for the same reasons.

Advantageously the data acquired during the driving dynamics measurement about a returning force, an amount of slip, or a tire reformation is stored also. In that case, instead of the estimate of the maximum friction only, also the driving dynamics measurement results can be combined to the road surface and environment measurement data, thus allowing estimation of the friction properties corresponding to the classified road surface quality, and the driving dynamics measurement data can be used for classification also. In that case the classification result of above described snowy road includes also information that the largest braking acceleration is achieved with larger slip rate larger than usual, and in wet tarmac a smaller slip than normal is allowable.

Figure 2:
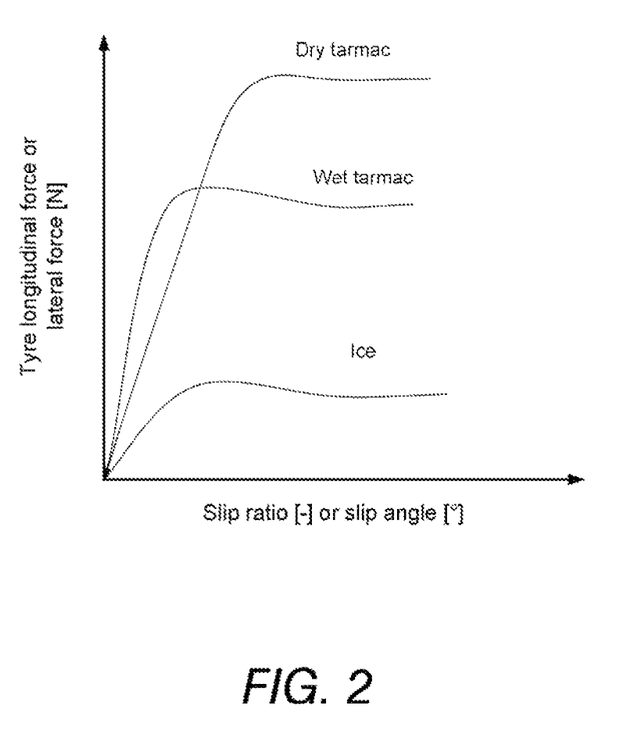
FIG. 2 represents the friction force as a function of a slip rate on different road surfaces.

FIG. 2 presents the measured relationship of slip and friction force on few types of road surface.

Figure 3:
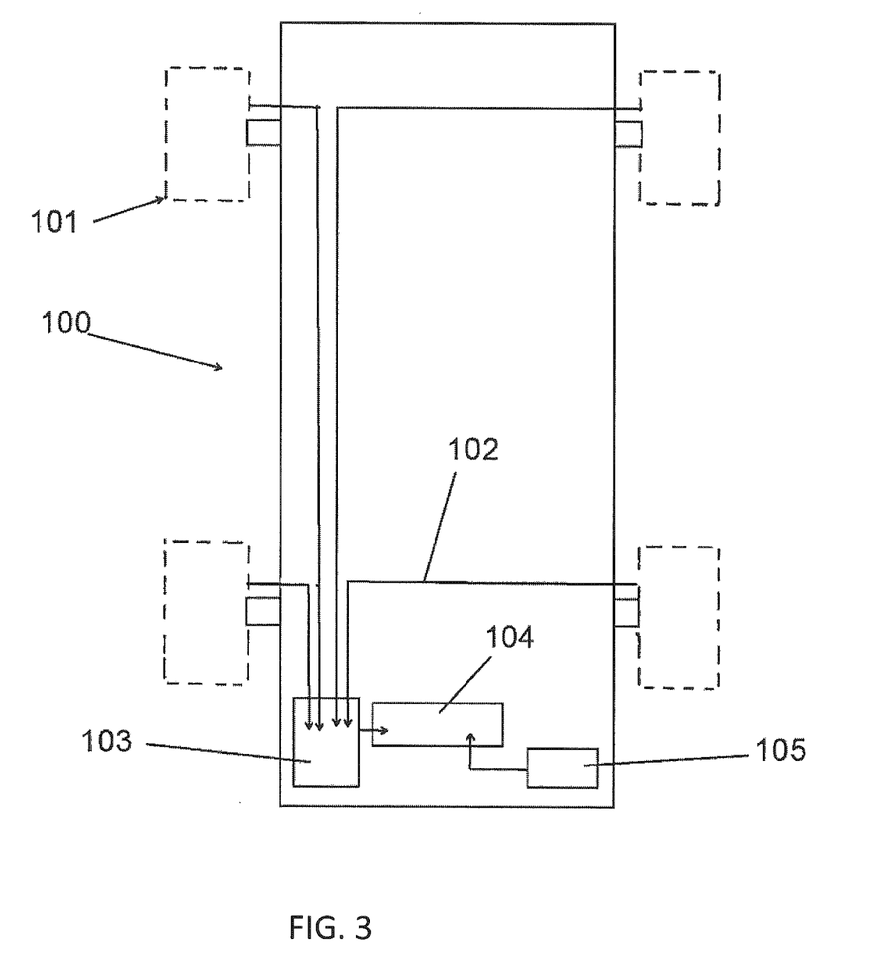
FIG. 3 schematically illustrates a vehicle having a system engaged therewith and configured to estimate a maximum friction available between a vehicular tire of the vehicle and a road surface.
Figure 4:
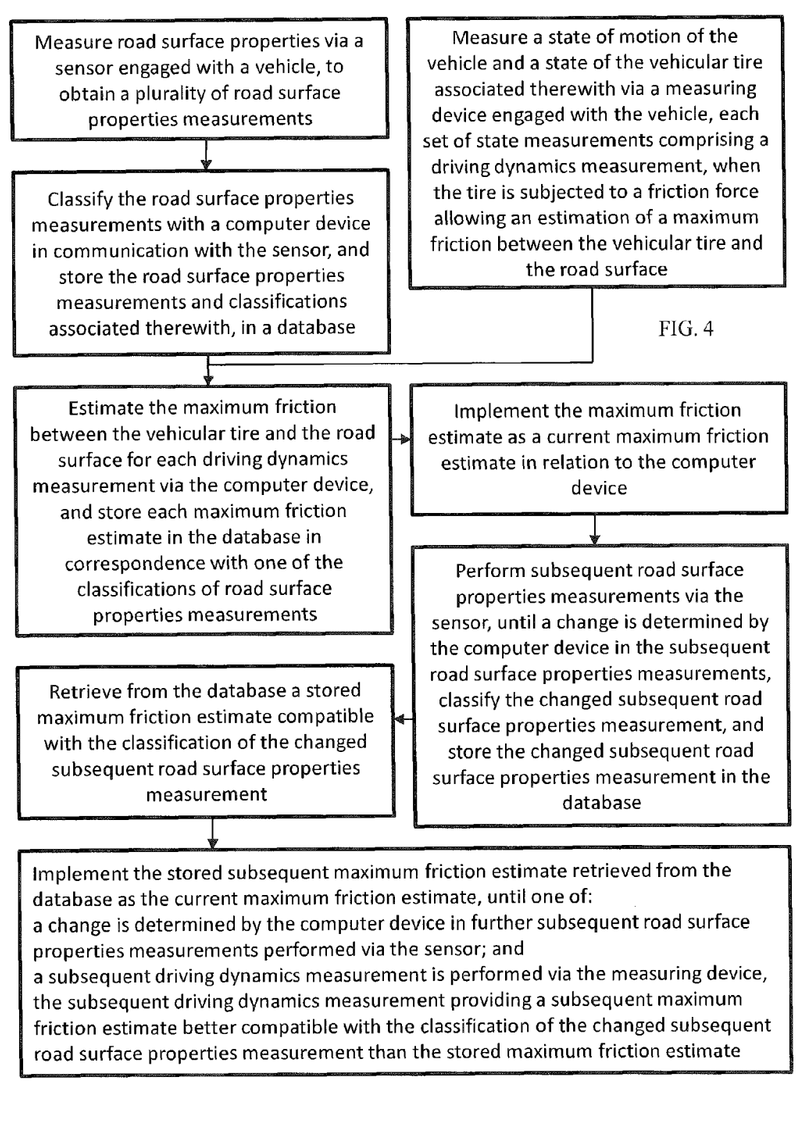
FIG. 4 schematically illustrates a method for estimating a maximum friction available between a vehicular tire and a road surface.
Figure 5:
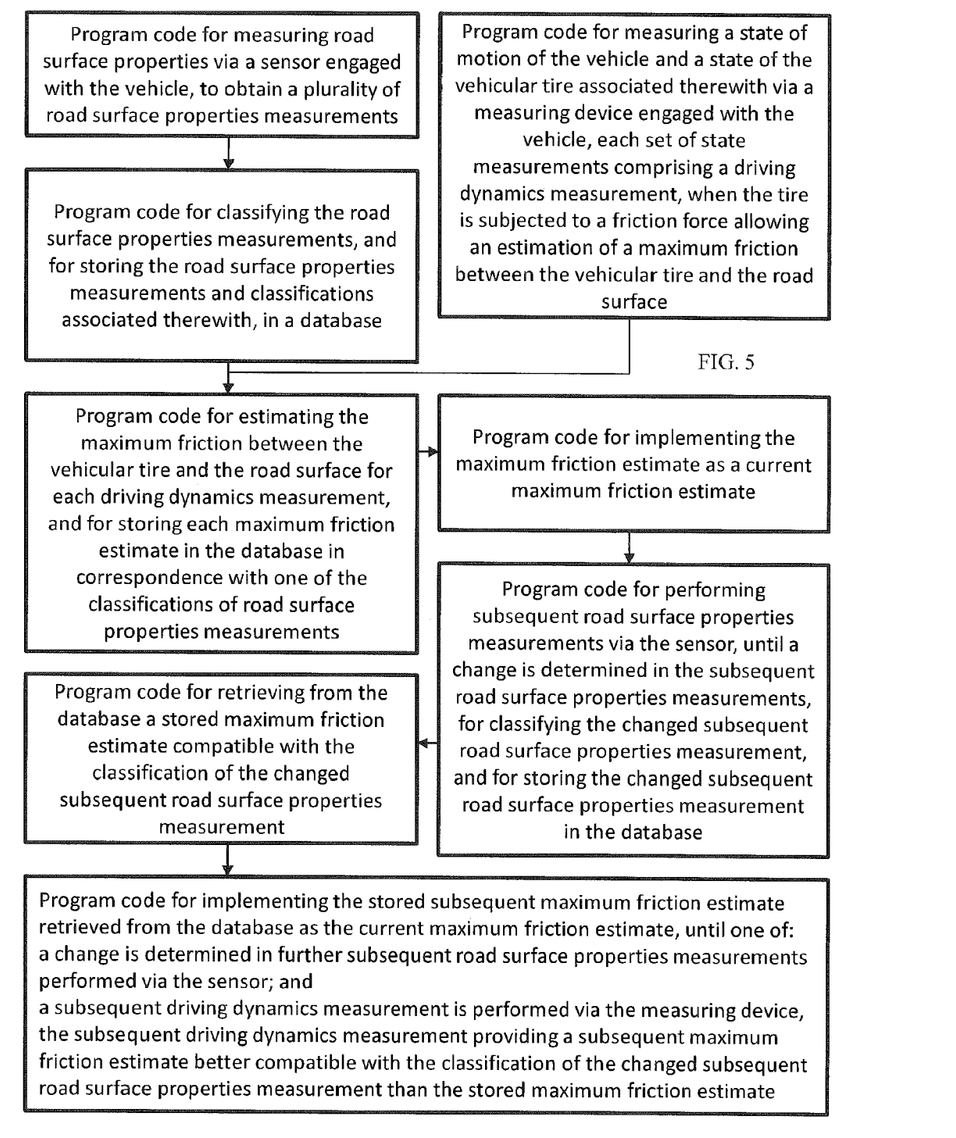
FIG. 5 schematically illustrates a computer program product comprising at least one non-transitory computer readable storage medium having computer program code stored thereon for estimating a maximum friction available between a vehicular tire of a vehicle and a road surface.

FIG. 3 shows schematically a vehicle 100 having tires 101. The vehicle is provided with a system including means 103 for obtaining driving dynamics data to estimate maximum friction or at least the minimum value of maximum friction between the road surface and tires. The vehicle is further provided with sensor means 105 for measuring road surface properties to be classified statistically. Memory means 104 are used to store the resulting maximum friction estimate results from the means 103 and road surface properties measured by sensor means 105 in a database in the memory means. FIG. 4 schematically illustrates a method for estimating a maximum friction available between a vehicular tire and a road surface which can be implemented by such a system associated with the vehicle 100 having tires 101, while FIG. 5 schematically illustrates a computer program product comprising at least one non-transitory computer readable storage medium having computer program code stored thereon for estimating a maximum friction available between a vehicular tire of a vehicle and a road surface, which can be implemented by such a system having a suitable computer device and being associated with the vehicle 100 having tires 101, and the associated method.

Advantageously for the classification of the aforementioned snowy road or wet tarmac the driving dynamics measurement data is also used. In that case it is taken into account that on slightly wet tarmac the slip is smaller than on dry tarmac with small friction forces according the FIG. 2. However, the maximum friction force is smaller on wet tarmac. In that case, if the ratio of the slip and the friction force is used for classification of the road surface in addition to the road surface measurement results, the road surface classified on basis of the road sensors will be identified correctly for its friction properties and the slip control system can be informed with more accurate estimate of the friction properties. This way the system learns gradually that on the wet surface the greater slip stiffness does not indicate larger maximum grip, and the system learns faster the optimum slip amount for each road surface in emergency breaking, and during breaking the more accurate estimate can be achieved before the grip is totally lost. In that case, for example, in snowy road not only the corresponding road surface and its friction properties can be identified, but also two road surfaces that are alike on sensor data can be identified using driving dynamics data with smaller-than-before amount of slip or even on basis of increased rolling resistance, thus categorizing the thicker snow differently even when the road sensor could not see the thickness of snow.

Also the thick layer of water causes changes in driving dynamics measurement results before the water aquaplaning start, said changes are easy to misinterpret because the return force of steering is changing as the grip area moves away from the front of the contact area in beginning of the hydroplaning. For this reason it is advantageous to feed the data measured with another vehicle into the system before starting to use the system, thus allowing warning the driver about hydroplaning with at least same accuracy as the non-learning system presented in publication EP0412791 is able to warn. The system according to the invention is not able to warn for example about hydroplaning without initial data before the aquaplaning has already occurred in a similar road surface. The system according to the invention on the other hand learns the deterioration of tyre properties as they wear out, if there has been driven close to hydroplaning limit and water layer thickness is resolvable from the sensor data.

Advantageously the system according to the invention stores at least friction information from the driving dynamics, in a way that the friction information is updated to the measurement results in addition to the maximum friction estimates. More advantageously the data from driving dynamics is used also for the classification of the road type, in which case the friction property information makes the road classification more accurate also with small slip rates. This allows not only recognition and giving an estimate for the each road surface, but also makes the estimate more accurate and classify the road surface by means of the friction properties with slip rate smaller-than-before.

Preferably the slip control system is informed about the likely dependency between the classified road surface and tire slip stiffness or tire reformation and maximum friction. The slip stiffness is customary separated to cornering stiffness and longitudinal slip stiffness (slip slope). At the same time the road surface is classified with friction measurements, for example with slip stiffness and steering return force. Consequently, the system learns to classify and estimate the properties of for example the gravel road of snowy road also by using the forces of tire even when the road sensor is not able to see for example the thickness of gravel or snow layer.

The system according to the invention learns the properties of the road surfaces used by each vehicle. Thus the system learns to recognise the typical road surfaces in each country correctly. Further the system does not need exact calibration of sensors or pre-made classification of road surfaces. It is enough that the sensor can produce different results on different road surfaces, so that the results can be classified reliably, so that the ageing of the sensors is at least not considerable faster than the wear of tires. This temporally organized self-measured data can be supplemented with use of geo data, or with use of for example centralized database and communication. Typical variations to friction properties of road surfaces are caused by local rock type, and for example the road surface eroded by studs is different from that worn by studless tires. Further, the antiskid treatment materials, like sand and salt, have an effect, and on the other hand for example the concrete does not tolerate studded tires and salt, and therefore it is hardly ever used in Nordic countries.

The invention claimed is:

1. A method for estimating a maximum friction available between a vehicular tire and a road surface, the method comprising:
measuring road surface properties via a sensor engaged with a vehicle, to obtain a plurality of road surface properties measurements;
classifying the road surface properties measurements with a computer device in communication with the sensor, and storing the road surface properties measurements and classifications associated therewith, in a database;
measuring a state of motion of the vehicle and a state of the vehicular tire associated therewith via a measuring device engaged with the vehicle, each set of state measurements comprising a driving dynamics measurement, when the tire is subjected to a friction force allowing an estimation of a maximum friction between the vehicular tire and the road surface;
estimating the maximum friction between the vehicular tire and the road surface for each driving dynamics measurement via the computer device, and storing each maximum friction estimate in the database in correspondence with one of the classifications of road surface properties measurements;
implementing the maximum friction estimate as a current maximum friction estimate in relation to the computer device;
performing subsequent road surface properties measurements via the sensor, until a change is determined by the computer device in the subsequent road surface properties measurements, classifying the changed subsequent road surface properties measurement, and storing the changed subsequent road surface properties measurement in the database;
retrieving from the database a stored maximum friction estimate compatible with the classification of the changed subsequent road surface properties measurement, by correlating the changed subsequent road surface properties measurement with the stored maximum friction estimate within the classification of the changed subsequent road surface properties measurement, according to a compatibility selection criterion including temporal proximity to present, and at least one of geographical proximity and identity of a stretch of road comprising the road surface; and
implementing the stored subsequent maximum friction estimate retrieved from the database as the current maximum friction estimate, until one of:
a change is determined by the computer device in further subsequent road surface properties measurements performed via the sensor; and
a subsequent driving dynamics measurement is performed via the measuring device, the subsequent driving dynamics measurement providing a subsequent maximum friction estimate better compatible with the classification of the changed subsequent road surface properties measurement than the stored maximum friction estimate.

2. A method as set forth in claim 1, further comprising classifying the road surface properties measurements according to one of a statistical method and a neural network method.

3. A method as set forth in claim 1, further comprising determining a change in maximum friction values between the vehicular tire and the road surface as a function of time.

4. A method as set forth in claim 1, further comprising determining a direction-specific friction coefficient of the vehicular tire by at least independently determining lateral and longitudinal force factors associated with the vehicular tire in relation to the road surface.

5. A method as set forth in claim 1, wherein measuring road surface properties further comprises measuring one of reflection loss at one or more wavelengths of electromagnetic radiation, polarization of reflection, spectrum of reflection delay or phase, a roughness measurement using a laser, speed, tire sound measured with a microphone or calculated characteristics thereof, temperature, temperature history, reflection of ultrasound from the road surface, radiation measured by a passive infrared sensor, a roughness profile of the road surface, slip between the vehicular tire and the road surface as function of friction force, roll resistance, vibration measured from the vehicular tire or reformation of the vehicular tire, geological position of the vehicle, steering forces, and air humidity and history information about air humidity.

6. A method as set forth in claim 1, further comprising one of obtaining one of the road surface properties measurement, the state of motion of the vehicle measurement, and the state of the vehicular tire measurement from other vehicles via a communication link, and processing the road surface properties measurement, the state of motion of the vehicle measurement, and the state of the vehicular tire measurement externally to the vehicle via transmission over a communication link.

7. A method as set forth in claim 1, further comprising presenting the current maximum friction estimate to one of a driver of the vehicle and other traffic as one of a braking distance, a turning radius, an applied maximum friction, an available maximum friction or via one of a haptic user interface, a visual signal, an audio signal, and a short-range transmission.

8. A vehicle, comprising a system engaged therewith and configured to estimate a maximum friction available between a vehicular tire of the vehicle and a road surface, the system comprising:
   a sensor engaged with a vehicle and configured to measure road surface properties to obtain a plurality of road surface properties measurements;
   a measuring device engaged with the vehicle and configured to measure a state of motion of the vehicle and a state of the vehicular tire associated therewith, each set of state measurements comprising a driving dynamics measurement, when the tire is subjected to a friction force allowing an estimation of a maximum friction between the vehicular tire and the road surface;
   a computer device including a processor in communication with the sensor and the measuring device, the processor being configured to classify the road surface properties measurements and to store the road surface properties measurements and classifications associated therewith, in a database, the processor being further configured to estimate the maximum friction between the vehicular tire and the road surface for each driving dynamics measurement, and to store each maximum friction estimate in the database in correspondence with one of the classifications of road surface properties measurements, the processor being further configured to implement the maximum friction estimate as a current maximum friction estimate in relation to the computer device, until a change is determined in subsequent road surface properties measurements performed via the sensor, the processor being further configured to classify the changed subsequent road surface properties measurement, and to store the changed subsequent road surface properties measurement in the database, the processor being further configured to retrieve from the database a stored maximum friction estimate compatible with the classification of the changed subsequent road surface properties measurement, by correlating the changed subsequent road surface properties measurement with the stored maximum friction estimate within the classification of the changed subsequent road surface properties measurement, according to a compatibility selection criterion including temporal proximity to present, and at least one of geographical proximity and identity of a stretch of road comprising the road surface, and to implement the stored subsequent maximum friction estimate retrieved from the database as the current maximum friction estimate, until one of a change being determined by the processor in further subsequent road surface properties measurements performed via the sensor, and a subsequent driving dynamics measurement being performed via the measuring device, the subsequent driving dynamics measurement providing a subsequent maximum friction estimate better compatible with the classification of the changed subsequent road surface properties measurement than the stored maximum friction estimate.

9. A computer program product comprising at least one non-transitory computer readable storage medium having computer program code stored thereon for estimating a maximum friction available between a vehicular tire of a vehicle and a road surface, the computer program code comprising:
   program code for measuring road surface properties via a sensor engaged with the vehicle, to obtain a plurality of road surface properties measurements;
   program code for classifying the road surface properties measurements, and for storing the road surface properties measurements and classifications associated therewith, in a database;
   program code for measuring a state of motion of the vehicle and a state of the vehicular tire associated therewith via a measuring device engaged with the vehicle, each set of state measurements comprising a driving dynamics measurement, when the tire is subjected to a friction force allowing an estimation of a maximum friction between the vehicular tire and the road surface;
   program code for estimating the maximum friction between the vehicular tire and the road surface for each driving dynamics measurement, and for storing each maximum friction estimate in the database in correspondence with one of the classifications of road surface properties measurements;
   program code for implementing the maximum friction estimate as a current maximum friction estimate;
   program code for performing subsequent road surface properties measurements via the sensor, until a change is determined in the subsequent road surface properties measurements, for classifying the changed subsequent road surface properties measurement, and for storing the changed subsequent road surface properties measurement in the database;
   program code for retrieving from the database a stored maximum friction estimate compatible with the classification of the changed subsequent road surface properties measurement, by correlating the changed subsequent road surface properties measurement with the stored maximum friction estimate within the classification of the changed subsequent road surface properties measurement, according to a compatibility selection criterion including temporal proximity to present, and least one of geographical proximity and identity of a stretch of road comprising the road surface; and
   program code for implementing the stored subsequent maximum friction estimate retrieved from the database as the current maximum friction estimate, until one of:
   a change is determined in further subsequent road surface properties measurements performed via the sensor; and
   a subsequent driving dynamics measurement is performed via the measuring device, the subsequent driving dynamics measurement providing a subsequent maximum friction estimate better compatible with the classification of the changed subsequent road surface properties measurement than the stored maximum friction estimate.

* * * * *